United States Patent [19]

Hongo

[11] Patent Number: 4,712,248
[45] Date of Patent: Dec. 8, 1987

[54] METHOD AND APPARATUS FOR OBJECT IDENTIFICATION

[75] Inventor: Yasuo Hongo, Kanagawa, Japan
[73] Assignee: Fuji Electric Company, Ltd., Kawasaki, Japan
[21] Appl. No.: 33,889
[22] Filed: Apr. 3, 1987

Related U.S. Application Data

[63] Continuation of Ser. No. 716,690, Mar. 27, 1985, abandoned.

[30] Foreign Application Priority Data

Mar. 28, 1984 [JP] Japan ................................ 59-58472

[51] Int. Cl.$^4$ ........................ G06K 9/48; G06K 9/46
[52] U.S. Cl. .................................... 382/22; 382/16; 382/25
[58] Field of Search .................. 382/21, 22, 25, 14, 382/16; 358/260

[56] References Cited

U.S. PATENT DOCUMENTS

| | | | |
|---|---|---|---|
| 3,942,169 | 3/1976 | Fujimoto et al. | 382/21 |
| 3,979,722 | 9/1976 | Sakoe | 382/21 |
| 4,040,009 | 8/1977 | Kadota et al. | 382/21 |
| 4,327,354 | 4/1982 | Persoon | 382/21 |
| 4,361,830 | 11/1982 | Honma et al. | 382/22 |
| 4,396,903 | 8/1983 | Habicht et al. | 382/22 |
| 4,545,067 | 10/1985 | Juvin et al. | 382/21 |
| 4,556,985 | 12/1985 | Hongo | 382/30 |
| 4,566,124 | 1/1986 | Yamamoto et al. | 382/21 |

OTHER PUBLICATIONS

Hongo et al., "Automatic Visual Measurement Applied to a Cashless Cafeteria System", 1984 *International Conf. on Industrial Electronics, Control and Instrumentation*, Oct. 22-26, 1984, pp. 114-119.

Feng et al., "Decomposition of Polygons into Simpler Components: Feature Generation for Syntactic Pattern Recognition", *IEEE Transaction on Computers*, vol. C-24, No. 6, Jun. 1975, pp. 636-650.

Persoon, "A System that Can Learn to Recognize Two-Dimensional Shapes", *Philips Tech. Rev.*, 38, No. 11/12, 1978/79, pp. 356-363.

*Primary Examiner*—Leo H. Boudreau
*Assistant Examiner*—Joseph Mancuso
*Attorney, Agent, or Firm*—Finnegan, Henderson, Farabow, Garrett, and Dunner

[57] ABSTRACT

An object identification method and apparatus determines within the boundary of an object to be identified points corresponding to abrupt changes in the profile of the object. Each segment of the boundary between adjacent points is identified with primitive element data and distance map data. These data associated with each segment are collated with similar type data associated with the boundaries of reference objects and the object is identified as the reference object having the highest coincidence of collation.

3 Claims, 25 Drawing Figures

METHOD AND APPARATUS FOR OBJECT IDENTIFICATION

This is a continuation of application Ser. No. 716,690, filed Mar. 27, 1985, now abandoned.

FIELD OF THE INVENTION

This invention relates to a method and apparatus for object identification suitable for use in an industrial robot and in which an object is photographed with a two-dimensional optical sensor such as an industrial television camera, and by deriving and using the object's contour data, objects having the same data are extracted or identified.

BACKGROUND OF THE INVENTION

One example of a conventional object identifying apparatus of this type is the Autovision II manufactured by Automatix Co. The apparatus employs the Stanford algorithm which has been developed by the Stanford University Laboratory. In the Stanford algorithm, different feature data (area, length/width, peripheral length, gravity center, inclination, maximum length from gravity center, average length from gravity center, the number of holes, etc.) are measured five to ten times. The results of the measurements are processed statistically to obtain the average values or difference values which correspond to set values. Object identification is carried out according to the determined set values. Such an apparatus is disadvantageous, however, in that an object to be identified must be an isolated blob or pattern. If a plurality of objects are in contact with one another or overlap one another, either it will be impossible to identify the objects or the objects will be erroneously identified.

OBJECTS AND SUMMARY OF THE INVENTION

An object of the present invention is an object identifying apparatus capable of identifying objects from the contour thereof;

Another object of the present invention is an object identifying apparatus capable of identifying an object that is in contact with, or overlaps, another object.

A further object of the present invention is an object identifying apparatus for extracting feature data of an object to be identified and for comparing the extracted feature data to feature data of reference objects to determine the identity of the object to be identified.

Still another object of the present invention is an object identifying apparatus that may be effectively used by a robot during the operation thereof.

These and other objects are attained by an apparatus for identifying an object from a video signal representing an image of the object, the apparatus comprising feature data extracting means for converting the video signal into boundary gradient and contour data representing the boundary of the object, means, coupled to the feature data extracting means, for processing the boundary gradient and contour data to identify abrupt changes in the gradient of the boundary of the object as a series of object points, means for generating primitive element data for each one of a plurality of segments singly disposed between adjacent ones of the object points on the boundary of the object and distance map data associated with the primitive element data to represent the positional relationships of each of the segments in the boundary of the object, dictionary memory means for storing primitive element data and distance map data associated with a plurality of known, reference objects, and means, coupled to the processing means, the generating means, and the dictionary memory means, for correlating the primitive element data and the distance map data associated with the object and the primitive element data and distance map data stored in the dictionary memory means and associated with the reference objects to identify the object as the one of the reference objects with the greatest correlation with the object.

BRIEF DESCRIPTION OF THE DRAWINGS

The manner in which the above and other objects, features, and advantages of the present invention are attained will become more clear from the following detailed description when considered in view of the drawings, wherein.

DETAILED DESCRIPTION

Figure 1A:
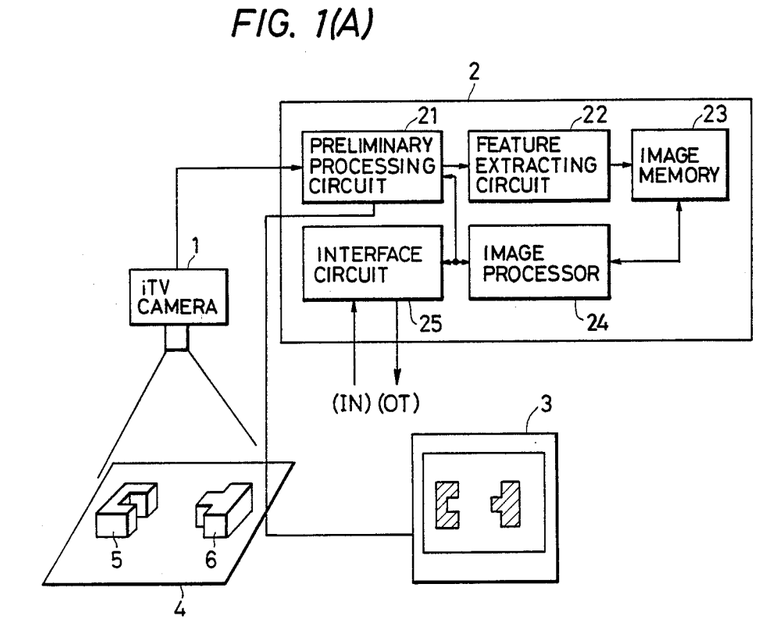
FIG. 1(A) is a schematic illustration of an embodiment of the object identifying apparatus of the present invention.
Figure 1B:
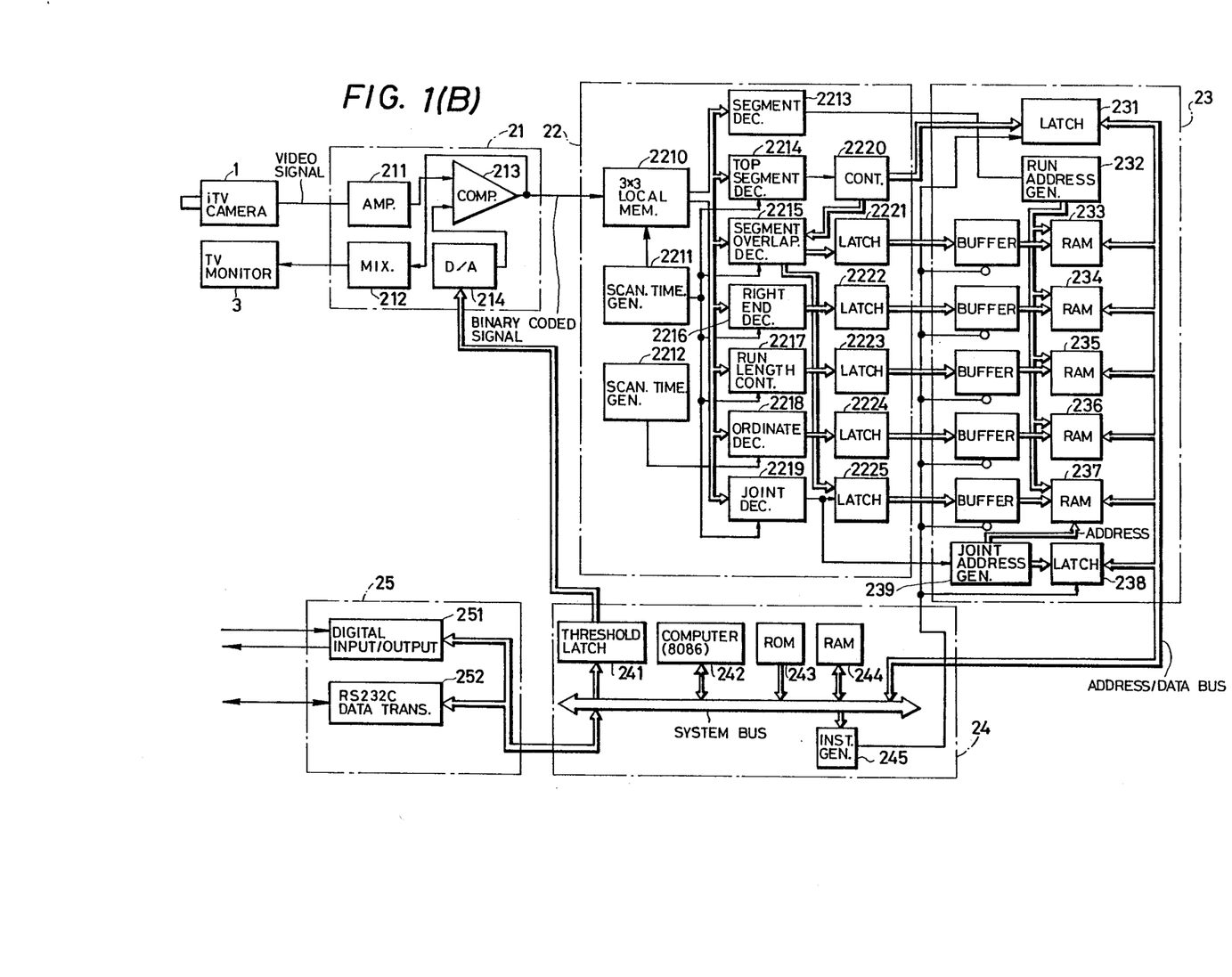
FIG. 1(B) is a detailed circuit block diagram of the embodiment of FIG. 1(A)
Figure 2:
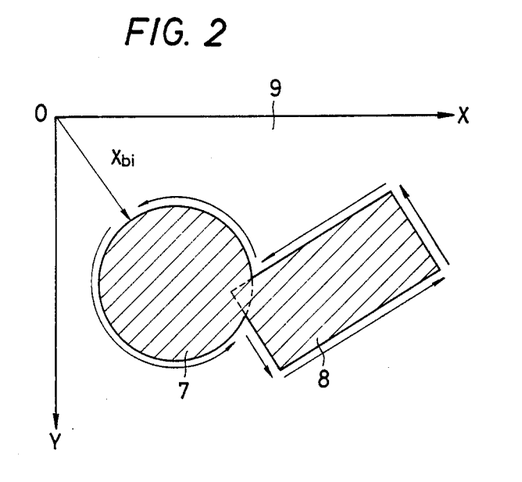
FIG. 2 is an explanatory diagram of an example of a binary-coded image.
Figure 3:
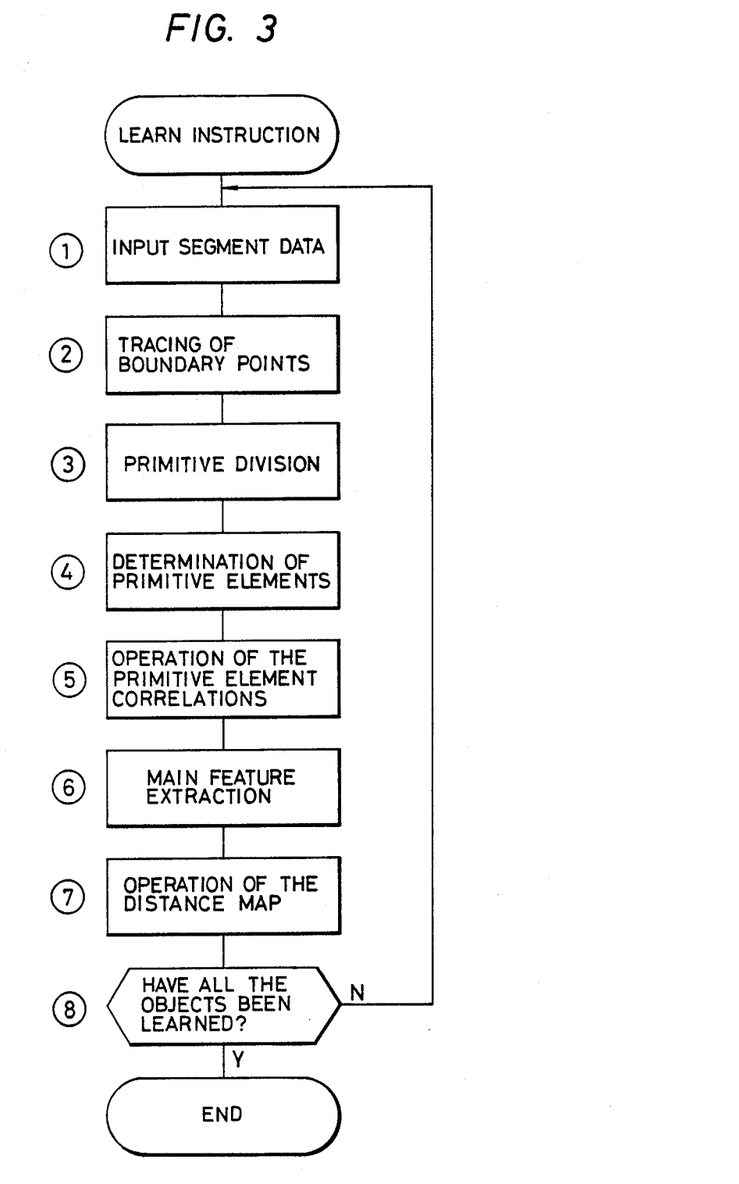
FIG. 3 is an operational flow diagram of the learning mode of the object identifying apparatus of FIG. 1(A)

FIGS. 1(A) and 1(B) show the arrangement of one embodiment of the present invention. FIG. 2 is an explanatory diagram for a description of an example of a binary-coded image. FIG. 3 is an operational flow diagram for a description of a processing operation in a learning mode. In FIG. 1(A), an industrial television iTV camera is connected to an object identifying apparatus 2 comprising a preliminary processing circuit 21, a feature extracting circuit 22, an image memory 23, an image processor 24, and an interface circuit 25. A monitor television set 3 is connected to the preliminary processing circuit 21.

Objects 5 and 6, different in color scheme from a background 4, are scanned by the iTV camera 1. The output video signal of the iTV camera 1 is converted into a binary signal by the preliminary processing circuit 21. The feature extracting circuit 22 divides the binary-coded image into picture elements having a predetermined size, extracts data on each picture element or on a segment representing a series of picture elements in a horizontal scanning line, and writes the data in the image memory 23 in a DMA (direct memory access) mode.

The image processor 24 performs a predetermined image process operation and an object identification process operation according to data read out of the image memory 23. Furthermore, the image processor 24 receives a learn instruction or identification instruction through the interface circuit 25, and stores the learned image process data in a learned image memory 26 or outputs an identification process result (OT). The monitor television set 3 can display an image picked up by the iTV camera 1 as it is or a binary-coded image as shown in FIG. 2.

In FIG. 1(B), the circuit components that are same as those in FIG. 1(A) bear the same reference numerals. The image processor 24 comprises an arithmetic element 242 composed of microcomputers 8086 and 8087, a program memory (ROM) 243, a processing memory (RAM) 244, a latch circuit 241 for latching digital data representing threshold levels (0 to 255) for binary coding and an image data loading instruction generator 245. The image processor 24 operates to supply to the preliminary processing circuit 21 the digital data as byte data.

The preliminary processing circuit 21 comprises an amplifier 211, a mixing circuit 212, a comparator 213 and a D/A converter 214. The digital data from the image processor 24 is first applied to the D/A converter 214 to be converted into analog data. The video signal of the iTV camera 1 is amplified by the amplifier 211 and the amplified signal is then applied to one input terminal of the comparator 213 to be compared with the analog data from the D/A converter 214. The output of the comparator 213 is applied to the feature extracting circuit 22 as binary-coded data. Further, the output of the comparator 213 is also applied to the mixing circuit 212 where the output is subjected to mixing operation with a synchronization signal to obtain a composite video signal. The composite video signal is then applied to the TV monitor 3.

In the feature extracting circuit 22, the applied binary-coded data is processed to obtain run(segment) data such as (a) segment length(run length), (b) abscissa of a segment's right end, (c) ordinate of a segment, (d) segment's piece number, (e) piece coupling data, (f) the number of segments(runs), and (g) the total number of piece coupling data.

The feature extracting circuit 22 will be described in more detail with reference to FIG. 1(B). In FIG. 1(B), reference numerals 2210 to 2225 designate circuit components as follows:

2210—Two-dimensional local memory for forming 3×3 picture element mask;
2211—Scanning(sampling) timing generator in a horizontal direction;
2212—Scanning(sampling) timing generator in a vertical direction;
2213—Segment(run) detection unit
2214—Top segment(run) detectdion unit
2215—Segment(run) overlapping detection unit;
2216—Unit for detecting segment's right end;
2217—Counter for counting run-length;
2218—Unit for detecting ordinate of segment;
2219—Unit for detecting segment joint;
2220—Counter;
2221 to 2225—latch units As mentioned above, the two-dimensional local memory 2210 produces a 3×3 picture element mask as shown for example in FIG. 6 of Hongo et al, Automatic Visual Measurement applied to a Cashless Cafeteria System, 1984 International Conference on Industrial Electronics, Control and Instrumentation, Tokyo Japan (1984). This mask moves in response to a reference clock signal of 6 MHz for instance. According to the movement of the mask in the horizontal direction, the end of segment, which is indicated by the continuous occurrence of black pixels, is detected by the run detection unit 2213 so as to be used for an addressing operation in writing segment data to the image memory 23. The top segment detection unit 2214 operates to detect the scanning line within the 3×3 picture element mask, on which there is no black pixel, whereby an occurrence of the top segment is detected. The number of the top segments on the scanning line is counted by the counter 2220.

The overlapping detection unit 2215 operates to detect whether the detected top segment overlaps that on the preceding scanning line, and the occurrence number of the overlapped segment on the preceding scanning line is checked and latched as a designated label. The segment's right end detecting unit 2216 operates to detect the right end and to output an abscissa thereof in accordance with the timing clock signal. The output is latched in the latch unit 2222. Similarly, the unit 2218 operates to detect the ordinate of the segment and to latch the detected ordinate in response to the segment detection. The run-length counter 2217 operates to count the number of clock pulses until the end of the segment is detected. Upon detection of the next new segment, the content of the counter is reset and its counting operation is restarted.

Joint detection is accomplished when there is a plurality of preceding scanning lines to be denoted as a designated label. In this case, the designated labels are latched as a pair.

The above described segment data for one whole picture frame is stored in the latch units of the circuit 22 and the latch units or memories 231 to 238 in the memory 23 in response to the image data loading instruction from the circuit 245. In the circuit 23, a segment address generator 232 operates to count the number of clock pulses until the segment is detected so as to produce an address signal. At the position assigned by the address signal, the label (segment's piece number), the segment's right end abscissa, the run-length and the ordinate of the segement are written (stored).

A joint address generator 239 and a latch unit 238 are provided. A system for joint detection is described in U.S. Pat. No. 4,556,985 that issued to Yasuo Hongo on Dec. 3, 1985, and is entitled "Pattern Recognition Apparatus".

The processor 24 operates to read out the content of the memory 23 to carry out the learning operation or the distinguishing operation of an object. The transmission of data to external components is controlled by an interface circuit 25 including a data transmission circuit 252 and a digital input/output circuit 251.

In response to a learn instruction given from outside the apparatus 2, a series of operation processes (1) through (8), shown in FIG. 3, are carried out. The operation processes (1) through (8) will be described with reference to the drawings, in the stated order.

(1) Segment data input

The segment data of the binary-coded image which has been stored in the image memory 23 through the preliminary processing circuit 21 and the feature extracting circuit 22 are applied to the image processor 24. The segment data are as listed below:

(a) segment length—Ai
(b) abscissa of a segment's right end—Xi
(c) ordinate of a segment—Yi
(d) segment's piece number—$N_{si}$
(e) piece coupling data The data (a), (b) and (c) are coherent with each segment. The data (d) and (e) are used to see how the segments should be connected to one another and to detect the pattern to which each segment belongs.

(2) Tracing of boundary points

Of the segments belonging to the same blob or pattern, picture elements forming a boundary against the background (hereinafter referred to as "boundary picture elements", when applicable) are extracted and traced according to a predetermined method. For instance in the case where, as shown in FIG. 2, a circular object 7 and a rectangular object object 8 are laid one on the other and are arranged in the effective image from the television camera, the image processor traces a boundary formed by the boundary picture elements counterlockwise (or clockwise) as indicated by the arrow, to obtain a boundary point sequence $[\dot{x}bi]$. In this connection, it should be noted that $[\dot{x}bi]$ is a set of boundary point coordinates expressed in vector form, and hereinafter a vector quantity will be expressed with a dot (·). In addition, the term "counterclockwise (or clockwise)" is intended to mean that the boundary points are followed while observing the blob or pattern on the left (or right) handed side at all times.

(3) Primitive division

In general, a boundary or line obtained by connecting boundary picture elements can be expressed with the fundamental elements of figures. The fundamental elements are hereinafter referred to as "primitive elements". The object identifying apparatus of the present considers the following three kinds of primitive elements:

(a) a straight line or a straight segment
(b) a circle or an arc
(c) an ellipse or an elliptic arc

Figure 4A:
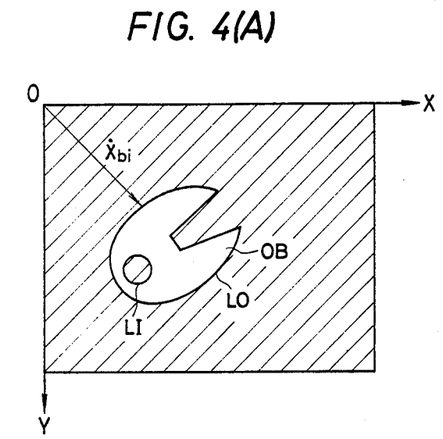
FIGS. 4(A) and 4(B) are explanatory diagrams for the description of an object to be learned and its primitive division condition.
Figure 4B:
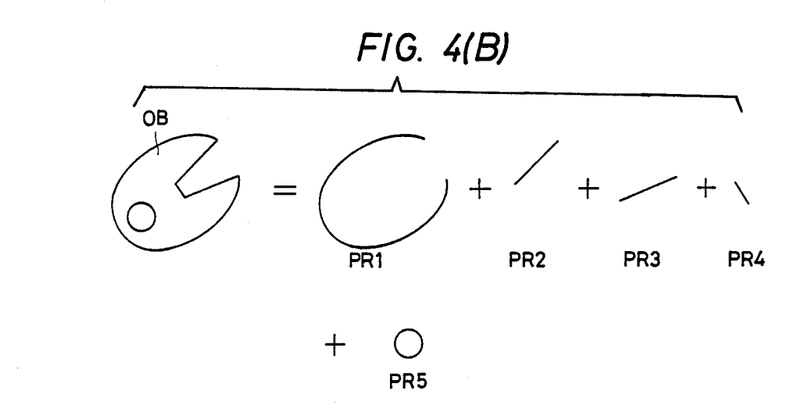

For instance, the picture of an object in part (A) of FIG. 4 can be divided into five primitive elements PR1 through PR5 as shown in part (B) of FIG. 4. This identification can be readily achieved by man, but not by machine. Therefore, in this embodiment, the following method is employed:

The gradients t and curvatures k of a boundary are defined. Then, change points where gradients or curvatures change abruptly are obtained, and the boundary is cut into parts at the change points. Thereafter, it is determined what primitive element expresses each of the parts, e.g., a circle, arc, ellipse, or elliptic arc.

Figure 5A:
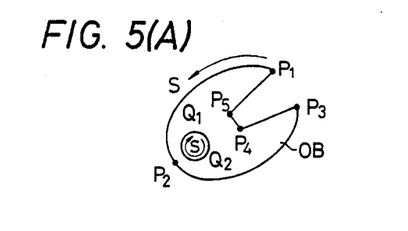
FIGS. 5(A), 5(B), and 5(C) are explanatory diagrams of the relationships between an object and its gradients and curves.

For instance, an object in part (A) of FIG. 5 has an outer periphery represented by a series of points $P_1$ through $P_5$, and an inner periphery represented by the collection of points $Q_1$ and $Q_2$. The points $P_1$, $P_3$, $P_4$ and $P_5$ on the outer periphery are bend-points, and the inner periphery has no bend-points and no change points. Therefore, the picture of the object can be divided into five primitive elements as described with reference to FIG. 4(B).

Figure 6A:
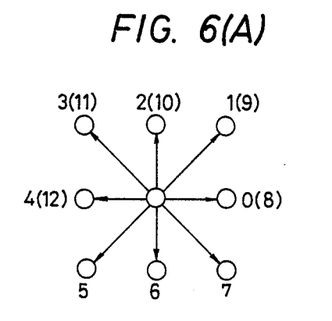
FIGS. 6(A) and 6(B) are explanatory diagrams for a description of direction codes and their increments and decrements.
Figure 6B:
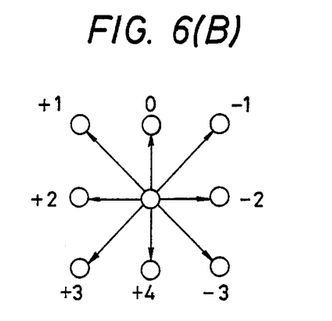
Figure 7A:
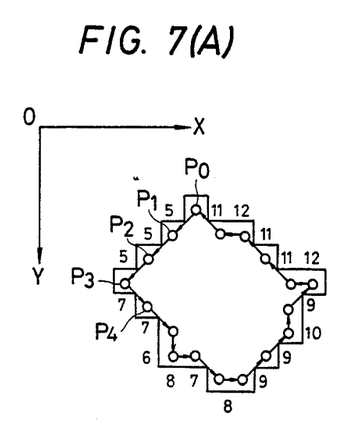
FIGS. 7(A) and 7(B) are explanatory diagrams for a description of a direction code determining method.

Now, the gradient t defined as above will be described in more detail. In order to obtain a gradient t, the concept of direction code as shown in part (A) of FIG. 6, and the concept of direction code increment and decrement as shown in part (B) of FIG. 6 are employed. That is, in the case where the binary-coded picture of an object is as shown in part (A) of FIG. 7 and the boundary picture elements are traced counterclockwise with the point $P_0$ as a base point, the direction of the point $P_1$ with respect to the point $P_0$ is obtained according to part (A) of FIG. 6, and the increment or decrement of the point $P_2$ with respect to the point $P_1$ is obtained according to part (B) of FIG. 6. The same operations are performed for the points $P_3$, $P_4$, ... in succession, to obtain a direction code dj.

Figure 7B:
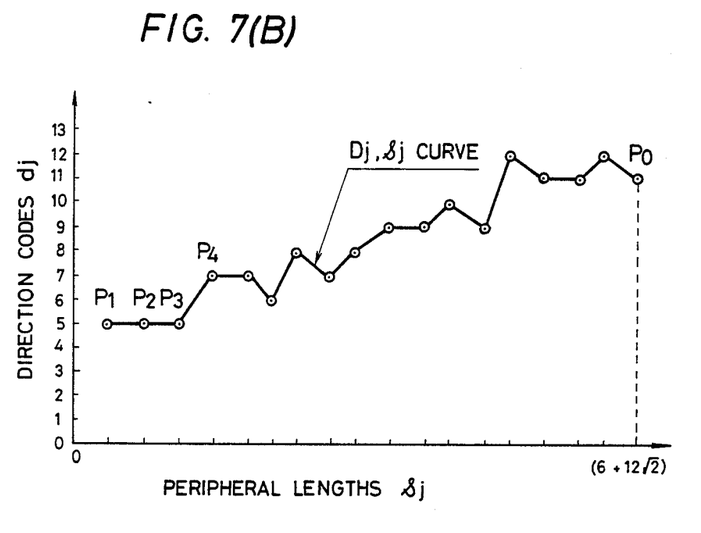

More specifically, in part (A) of FIG. 7, the point $P_1$ is in a direction of 135° of the point $P_0$, and therefore its direction code is "5" according to part (A) of FIG. 6. The directions of the points $P_2$ and $P_3$ are the same as that of the point $P_1$, and therefore their increments or decrements are 0. The direction of the point $P_4$ is changed by 90° to the left with respect to the direction of the point $P_3$. Therefore, if, in part (B) of FIG. 6, the direction of the point $P_3$ is set to "0", then the direction code increment is "+2", and the direction code is "7" (5+2). Accordingly, the direction code $d_j$ of the object shown in part (A) of FIG. 7 are as follows:

The digits encircled are for peripheral lengths of $\sqrt{2}$ picture elements, and the other are for peripheral lengths of 1 picture element. Accordingly, the relationships between the direction codes $d_j$ and the peripheral lengths sj are as indicated in part (B) of FIG. 7. The sum of peripheral lengths is $(6+12\sqrt{2})$ picture elements.

The direction code dj thus obtained is considerably variable. Therefore, the average value in the vicinity of the peripheral length sj is obtained so as to be defined as a gradient tj.

$$tj = \frac{j \sum_{\epsilon} Sjdj \times \Delta sj}{j \sum_{\epsilon} Sj\Delta sj} \quad (1)$$

$$\Delta sj = s(j+1) - sj \quad (1')$$

$$Sj = j \sum_{\epsilon} sj \, sj \quad (1'')$$

That is, the gradient tj is obtained by smoothing the direction code according to the expression (1). In the expression (1), $\Delta sj'$ is $\sqrt{2}$ picture elements when dj' is an odd number, and it is 1 picture element when dj' is an even number, and Sj is near the peripheral length sj. In the expression (1), the denominator represents the length lj in the vicinity of the peripheral length sj, and it is generally 1 through 5 picture elements. If the length lj is considerably larger, then the gradient tj becomes small, which causes it to become impossible to detect bend points and change points.

The gradient tj is utilized to define the curvature kj as follows:

$$k_j = \frac{t_{j+\Delta j} - t_{j-\Delta j}}{s_{j+\Delta j} - s_{j-\Delta j}} \quad (2)$$

Figure 5B:
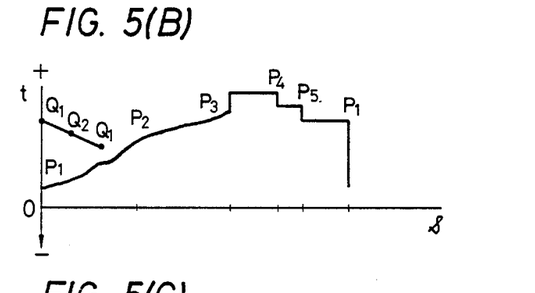
Figure 5C:
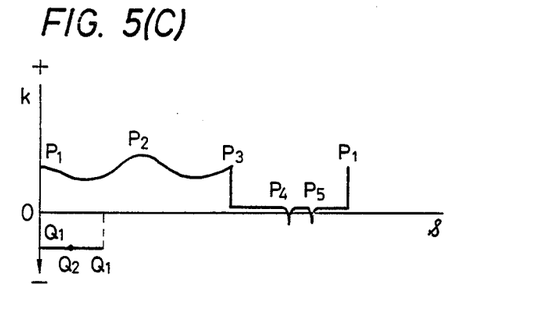

Thus, the gradients and curvatures of the inner and outer peripheries of an object as shown in part (A) of FIG. 5 can be obtained as described above and can be indicated as shown in parts (B) and (C) of FIG. 5, respectively.

The bend points and the change points are evaluated with a quantity represented by the following expression (3), namely, a steepness coefficient $\gamma_j$.

$$\gamma_j = k_j - \frac{k_{j+\Delta j} + k_{j-\Delta j}}{2} \quad (3)$$

Figure 8:
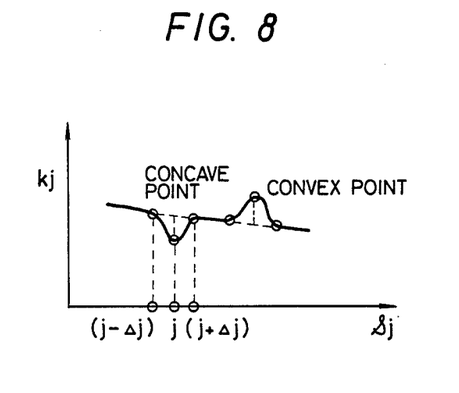
FIG. 8 is an explanatory diagram for a description of a convex point and a concave point.

As is apparent from FIG. 8, the expression (3) is to obtain the difference between the gradient of the point j and the average value of the gradients of two points which are located on both sides of the point j. When the value j is positive and maximum, the point j is a convex point. When the value j is negative and minimum, the point j is a concave point. These convex and concave points are used to express bend points.

The figure in part (A) of FIG. 5 includes no change points. However, at the change point, the sign of the gradient kj is changed from positive to negative, or from negative to positive, but the change is not so abrupt as that at a bend point.

The inner and outer peripheries of a probe or pattern can be divided into parts by using the bend point (convex point and concave point) or change points thus defined. One example of this division is as shown in part (B) of FIG. 4.

(4) Determination of primitive elements

In this step, the determination of a primitive element to which a segment obtained by the above-described division belongs is carried out. The features of primitive elements represented by the gradients tj and the curvatures kj are, in general, as indicated in Table 1 below:

TABLE 1

| Feature | Primitive | | |
|---|---|---|---|
| | Straight line | Circle | Ellipse |
| Gradient tj | constant | Linear slope | Wavy slope |
| Curvature kj | zero | constant | Wave |

According to Table 1, it can be determined whether the primitive element is a straight line, a circle or an ellipse. In addition, the identification according to the method of least squares in carried out.

If a curve passing through a boundary point coordinate $x_{bi}$ on a segment obtained by dividing a periphery is $$F(\dot{x}_{bi}, \dot{c}_j) = 0 \quad (4)$$

and the total of boundary points on the segment is represented by $N_B$, then the evaluation function $\delta$ according to the method of least squares can be represented by the following equation (5):

$$\delta = \sum_{i=1}^{N_B} \{F(\dot{x}_{bi}, \dot{c}_j)\}^2 \quad (5)$$

In this case, if the number of boundary points is increased, the parameters of the function F which meets the expression (4) at all times cannot be determined. Therefore, the parameter $\dot{c}_j$ with which the sum $\delta$ of the squares of errors becomes minimal is obtained, and a curve determined from the parameter $\dot{c}_j$ is employed as a curve which describes a segment. In this case, for three kinds of primitive elements, the following expressions are employed:

$$(\dot{x}_{bi} - \dot{c}_0) \cdot \dot{c}_1 = 0 \quad (6)$$

$$(\dot{x}_{bi} - \dot{c}_0)^2 = c_1^2 \quad (7)$$

$$|\dot{x}_{bi} - \dot{c}_0| + |\dot{x}_{bi} - \dot{c}_1| = c_2 \quad (8)$$

The expressions (6), (7) and (8) are general expressions of a straight line, a circle and an ellipse, respectively. In these expressions, $\dot{c}_0$ and $\dot{c}_1$ are to express a point in vector form, and $\dot{c}_1$ and $\dot{c}_2$ are constants.

The minimal condition is as follows:

$$\frac{\partial \delta(\dot{x}_{bi}, \dot{c}_j)}{\partial \dot{c}_j} = 0 \quad (9)$$

By solving the simultaneous equations of the parameter, the determination of a primitive element is achieved. On the other hand, the obtained parameter is represented by $\hat{c}_j$, and the evaluation value $\hat{\delta}_0$ at that time is obtained from the expression (5) described above. When the following expression (10) is satisfied, that segment is determined as a curve which is identified by the parameter $\hat{c}_j$ $$\hat{\delta}_0 / \hat{S}_0 < \Delta \delta \text{(where } \Delta \delta \text{ is constant)} \quad (10)$$

In the expression (10), $\hat{S}_0$ is the length of a part which is obtained by dividing a periphery.

By the above-described process, all the peripheries (boundaries) of all blobs have been expressed by predetermined primitive elements.

Next, the following attributes of each primitive element are obtained:

(a) Name: A straight line, circle, arc, ellipse and elliptic arc have names "1", "2", "3", "4" and "5", respectively. A noise segment is a primitive element which is identified with none of these figures, and it has a name "0".

(b) End point: Both end coordinates $\dot{x}_S$ and $\dot{x}_E$ (c) Center: Center's coordinates $\dot{x}_C$ (d) Diameter (major diameter and minor diameter): $R_A$ and $R_B$ (e) Main direction: Direction vector $\vec{1}_P$ (f) Segment length: $S_P$ These data are indicated in Table 2 in more detail. The main direction of an ellipse is the direction of the principal axis passing through the foci. As the main direction of a circle cannot be determined unequivocally, the direction of the X-axis (1,0) is employed for convenience. The main direction of a straight line is the direction of its segment.

TABLE 2

| Primitive element Attribute | Ellipse | Circle | Straight line |
|---|---|---|---|
| Name | Ellipse → 4<br>Elliptic arc → 5 | Circle → 2<br>Arc → 3 | 1 |
| End points<br>$\dot{x}_S, \dot{x}_E$ | $\dot{x}_S, \dot{x}_E$ | $\dot{x}_S, \dot{x}_E$ | $\dot{x}_S, \dot{x}_E$ |
| Center<br>$\dot{x}_c$ | Ellipse center<br>$\dot{x}_c$ | Circle center<br>$\dot{x}_c$ | Segment center<br>$\dot{x}_c = \dfrac{\dot{x}_S + \dot{x}_E}{2}$ |
| Diameter<br>$R_A, R_B$ | Major diameter $R_A$<br>Minor diameter $R_B$ | Radius R<br>$R_A = R_B = R$ | $R_A = R_B = \dfrac{\|\dot{x}_S - \dot{x}_E\|}{2}$ |
| Main direction<br>$\vec{Ip}$ | Ellipse principal axis<br>$\vec{Ip}$ | Horizontal axis<br>$\vec{Ip} = (1,0)$ | Segment direction<br>$\vec{Ip} = \dfrac{\dot{x}_E - \dot{x}_S}{\|\dot{x}_E - \dot{x}_S\|}$ |
| Segment length<br>Sp | Peripheral length<br>Sp | Peripheral length<br>Sp | Length<br>$Sp = \|\dot{x}_E - \dot{x}_S\|$ |

(5) Operation of the primitive element correlations

Figure 9:
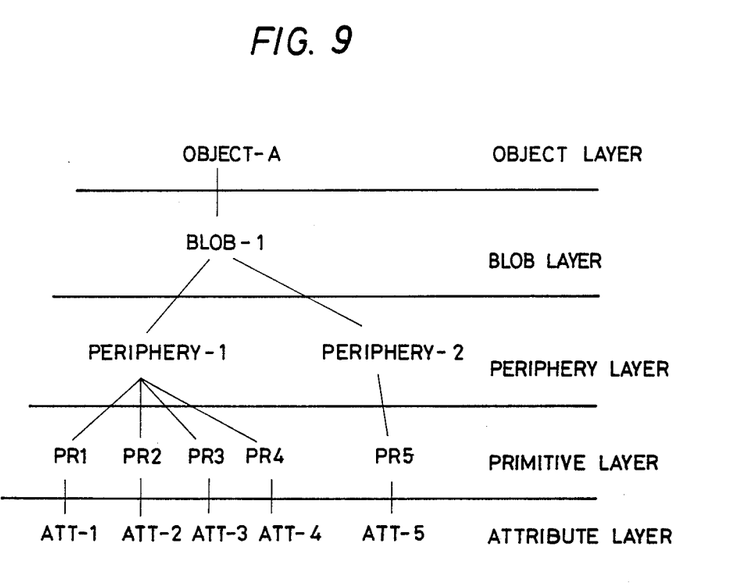
FIG. 9 is an explanatory diagram for a description of the hierarchical structure of an object shown in FIG. 4(A) and in FIG. 5(A)

Based on the above description, an object can be represented by a hierarchical structure as shown in FIG. 9. That is, an object is made up of some blobs, and each blob is made up of one outer periphery (PERIPHERY-1) and some inner peripheries (PERIPHERY-2). In the above-described example, the peripheries are divided into the primitive elements PR1 through PR5 which have attribute values ATT-1 through ATT-5, respectively. Accordingly, if a primitive element is included in the first periphery, then it can be determined that it belongs to the outer periphery. As long as primitive elements are numbered according to the rule which is predetermined for tracing a boundary, the arrangement of the primitive elements can be known from a hierarchical structure tree diagram as shown in FIG. 9.

Figure 10:
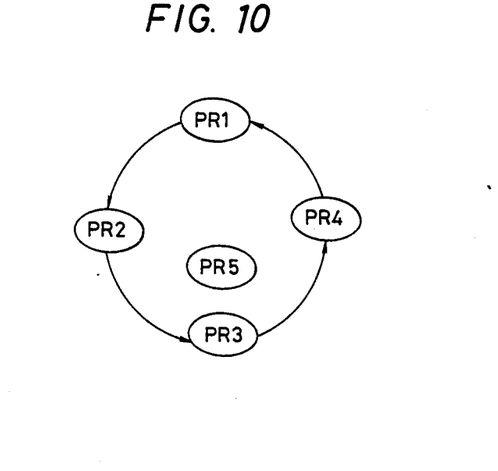
FIG. 10 is an explanatory diagram for a description of a phase condition of an object.

In the above-described example, the correlations of the primitive elements are as shown in FIG. 10. Rules for drawing this diagram are as follows:

(a) The first periphery of a blob is the outer periphery, and the succeeding peripheries are the inner peripheries.

(b) The primitive elements are numbered in order of tracing the boundary.

The correlations of the primitive elements can be obtained according to the above-described method. The term "correlations" is intended to mean the chain of primitive elements, i.e., the determination of the order of the primitive element to the outer periphery or to an inner periphery.

(6) Main feature extraction

Figure 11:
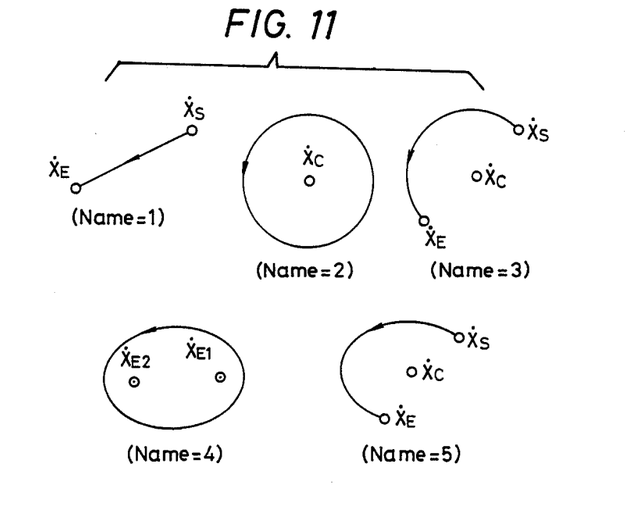
FIG. 11 is an explanatory diagram for a description of the main features of primitive elements.

In order to detect the positional relationships of primitive elements, the main features of the primitive elements are defined with the following data:

(a) Straight line: both end portions $\dot{x}_S$ and $\dot{x}_E$
(b) Circle: center (one point) $\dot{x}_C$
(c) Ellipse: foci (two points) $\dot{x}_{E1}$ and $\dot{x}_{E2}$
(d) Arc: both end points and a center (three points) $\dot{x}_S$ and $\dot{x}_E$, and $\dot{x}_C$
(e) Elliptic arc: both end points and a center (three points) $\dot{x}_S$ and $\dot{x}_E$, and $\dot{x}_C$ The above-described relationships will become more apparent from FIG. 11.

(7) Operation of the distance map

The concept of distance Dij, which is a block matrix as expressed in equation 11, is applied between primitive elements PRi and PRj. When the main features are provided for the primitive elements as indicated in Table 3, then the distance, expressed by, Dij is as follows:

$$Dij = \begin{pmatrix} |\dot{x}_{FAi} - \dot{x}_{FAj}| & |\dot{x}_{FAi} - \dot{x}_{FBj}| & |\dot{x}_{FAi} - \dot{x}_{FCj}| \\ |\dot{x}_{FBi} - \dot{x}_{FAj}| & |\dot{x}_{FBi} - \dot{x}_{FBj}| & |\dot{x}_{FBi} - \dot{x}_{FCj}| \\ |\dot{x}_{FCi} - \dot{x}_{FAj}| & |\dot{x}_{FCi} - \dot{x}_{FBj}| & |\dot{x}_{FCi} - \dot{x}_{FCj}| \end{pmatrix} \quad (11)$$

where $|\dot{x}_{FAi} - \dot{x}_{FAj}|$, for example, means a distance between the points FAi and FAj.

TABLE 3

| | Name | | | | |
|---|---|---|---|---|---|
| Main feature | 1 | 2 | 3 | 4 | 5 |
| $\dot{x}_{FA}$ | $\dot{x}_S$ | $\dot{x}_C$ | $\dot{x}_S$ | $\dot{x}_{E1}$ | $\dot{x}_S$ |
| $\dot{x}_{FB}$ | $\dot{x}_E$ | | $\dot{x}_C$ | $\dot{x}_{E2}$ | $\dot{x}_C$ |
| $\dot{x}_{FC}$ | | | $\dot{x}_E$ | | $\dot{x}_E$ |

Some of the primitive elements have only one or two main features. In this case, the elements of the matrix Dij represented by the expression (11) are not calculated. In other words, "0" is inserted in the blanks in Table 3, and when the main feature point coordinate is "0", the elements of the matrix Dji corresponding thereto are set to "0".

An object is made up of several primitive elements. Therefore, when the total number of primitive elements of the object is $N_{TPR}$, the number of distances is represented by $N_{TPR}C_2$. The set (Dij) of distance matrices will be referred to as "a distance map". As the number of primitive elements increases, the number of distance matrices is increased and the processing time is also increased. Therefore, it is desirable to employ suitable means to increase the processing speed.

The above-described expression (11) is for the case where three main features are employed. If the main feature point set of the i-th periphery is $$\{\dot{x}^i_{F1}, \dot{x}^i_{F2}, \ldots \dot{x}^i_{FM}\}$$

and that of the j-th periphery is $$\{\dot{x}^j_{F1}, \dot{x}^j_{F2}, \ldots \dot{x}^j_{FN}\}$$

then the distance map $M_{ij}$ is as follows:

$$M^{ij} = \begin{pmatrix} |\dot{x}^i_{F1} - \dot{x}^j_{F1}| & |\dot{x}^i_{F1} - \dot{x}^j_{F2}| & \cdots & |\dot{x}^i_{F1} - \dot{x}^j_{FN}| \\ |\dot{x}^i_{F2} - \dot{x}^j_{F1}| & |\dot{x}^i_{F2} - \dot{x}^j_{F2}| & \cdots & |\dot{x}^i_{F2} - \dot{x}^j_{FN}| \\ \vdots & \vdots & & \vdots \\ |\dot{x}^i_{FM} - \dot{x}^j_{F1}| & |\dot{x}^i_{FM} - \dot{x}^j_{F2}| & \cdots & |\dot{x}^i_{FM} - \dot{x}^j_{FN}| \end{pmatrix} \quad (12)$$

The main feature point set as herein used includes no primitive elements in duplication. More specifically, one of the main feature points of the object shown in part (A) of FIG. 5, for instance the point $P_1$, can be represented by the primitive elements "1" and "2". The main feature point set, however, is such that an operation of changing two primitive elements into one of the two primitive elements is carried out.

Thus, the object has been learned, and the results of the learning are stored in a dictionary memory. When all the objects have been learned (cf. (8) in FIG. 3), the operation mode is shifted to the identification mode.

Figure 12:
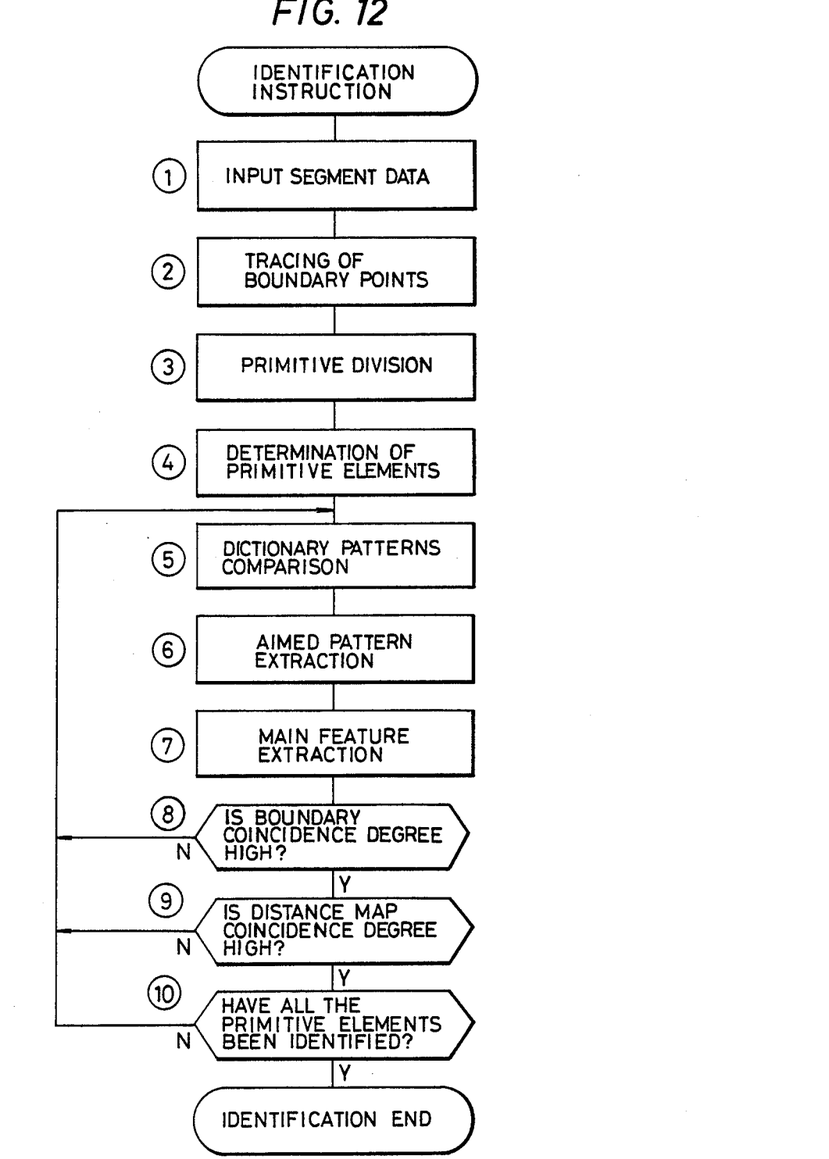
FIG. 12 is a operational flow diagram for a description of the main features of primitive elements by the object identifying apparatus of FIG. 1(A)

FIG. 12 is a flow chart for a description of the identification operation of the image processor.

In response to an identification instruction, first the segment data are inputted (cf. (1) in FIG. 3), and the boundary point tracing operation is carried out (cf. (2) in FIG. 3). For each periphery, the bend points and the change points are determined from the gradients and the curvatures, and the periphery is divided into primitive elements by utilizing the bend points and the change points (cf. (3) in FIG. 3). The attributes of each primitive element, i.e., the name, end points, center, diameter, main direction and segment length, are obtained (cf. (4) in FIG. 4). The above-described process is the same as the learning process.

The dictionary patterns of objects includes the hierarchical structures, the attribute and the main features of the primitive elements, the main feature point sets of peripheries, and the distance maps between peripheries. Therefore, an aimed pattern is extracted by taking the dictionary patterns into account (cf. (5) and (6) in FIG. 3). In this case, the object to be identified may be mixed with other objects; that is, the boundary of the object may not be clear. Therefore, the object to be identified is divided according to the primitive elements, so that the aimed pattern correlates highly with a dictionary pattern. This means that the combination of primitive elements is extracted.

Sometimes the primitive elements are disconnected or arranged irregularly. Therefore, some aimed patterns are taken out of the binary-coded image to be identified. The main feature points of the aimed patterns thus taken out are obtained (cf. (7) in FIG. 3), and suitable ones of the aimed patterns are selected according to two kinds of evaluation data described below (cf. (8) and (9) in FIG. 3).

(a) Boundary (length) coincidence degree: $\delta_{BND}$
(b) Distance map coincidence degree: $\delta_{MAP}$ The aimed pattern which is smallest in these values is obtained as a result of the identification. In this manner, the identification is successively carried out. When all the primitive elements have been identified, the identification is ended (cf. (10) in FIG. 3).

Figures 13A, 13B, 13C, 13E:
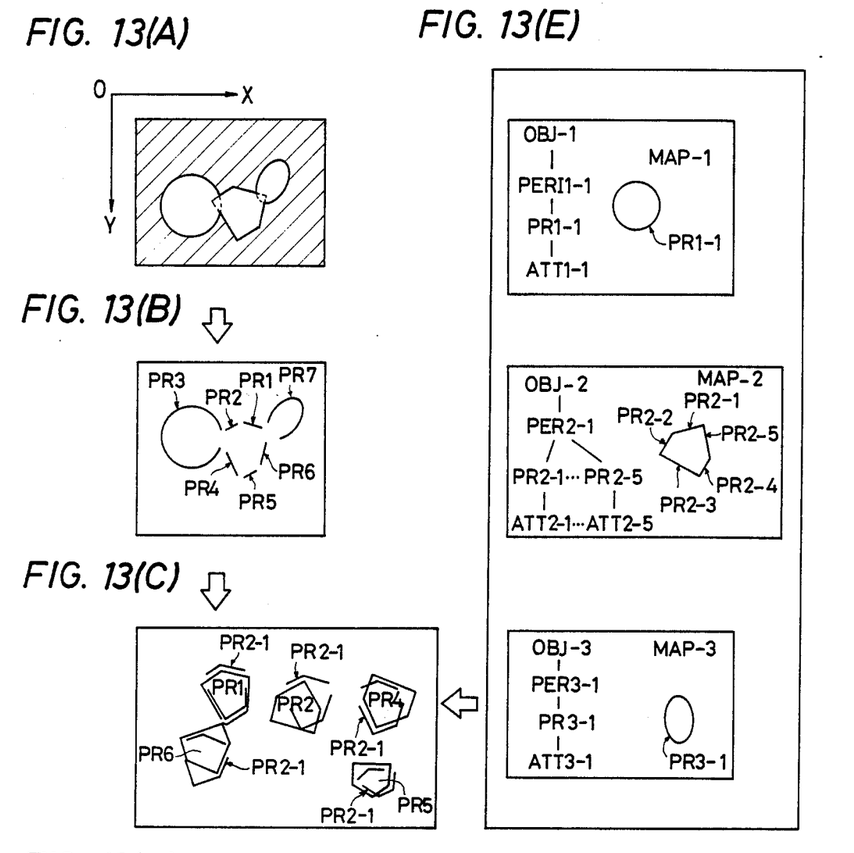
FIGS. 13(A) through 13(E) are explanatory diagrams for description of a collation process performed by the object identifying apparatus of FIG. 1(A)
Figure 13D:
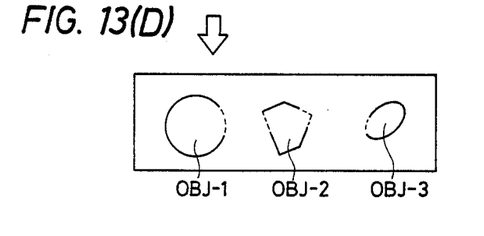

FIG. 13 is an explanatory diagram for a description of the collation process.

In the case where a thing to be identified is a plurality of objects overlapped as shown in part (A) of FIG. 13, the boundary of the thing can be divided into primitive elements PR1 through PR7 as shown in part (B) of FIG. 13. It is assumed that, for the three objects OBJ-1, OBJ-2 and OBJ-3, maps MAP-1, MAP-2 and MAP-3 have been learned, respectively, as shown in part (E) of FIG. 13. These maps include the primitive element attributes and the distance maps.

The collation of the primitive elements PR3 and PR7 can be achieved immediately because, of the dictionary maps, the circle and the ellipse are held by the objects OBJ-1 and OBJ-3, respectively. In the two dictionary maps, the distance maps are simple, and therefore the identification can be sufficiently accomplished merely by detecting the primitive element attributes.

The remaining primitive elements PR1, PR2, PR4, PR5 and PR6 are straight lines "1", and only the object OBJ-2 has such straight line primitive elements. Therefore, all that is necessary is to perform the application of primitive elements suitably.

As shown in part (C) of FIG. 13, for instance with the primitive element PR2-1 as a reference, the application of primitive elements to the thing to be inspected is carried out. In the case of a straight line, an end point is lost, or a false end point appears because the straight line is cut. The end point of the straight line can be obtained, however, by detecting the intersection of the straight line and the following straight line. While the end point is being estimated in this manner, the correspondence with the distance map is obtained. The collation pattern thus obtained is evaluated with the above-described evaluation data, and is outputted as identification results as shown in part (D) of FIG. 13. The evaluation equations are as follows:

$$\delta_{BND} = \frac{\text{total length of collated primitive elements}}{\text{total length of collated dictionary primitive elements}} \quad (13)$$

$$\delta_{MAP} = \sum_{i,j \in \Omega} \left| \frac{M^{ij} - \hat{M}^{ij}}{\hat{M}^{ij}} \right| \quad (14)$$

where $\hat{M}^{ij}$ is the dictionary distance map, $M^{ij}$ is the distance map obtained from the collated primitive element, and $\Omega$ is all of the combinations of the object.

It goes without saying that the best result is obtained when the evaluation data $\delta_{BND}$ is one and the evaluation data $\delta_{MAP}$ is zero.

Summarizing the above description, it can be determined that a thing to be inspected is identified when the following conditions are satisfied:

$$|\delta_{BND} - 1| < \delta_{BNDU} \quad (15)$$

$$\delta_{MAP} < \delta_{MAPU} \quad (16)$$

where BNDU and MAPU are the upper limit values thereof.

The process in the identification mode is carried out as described above.

Figure 14A:
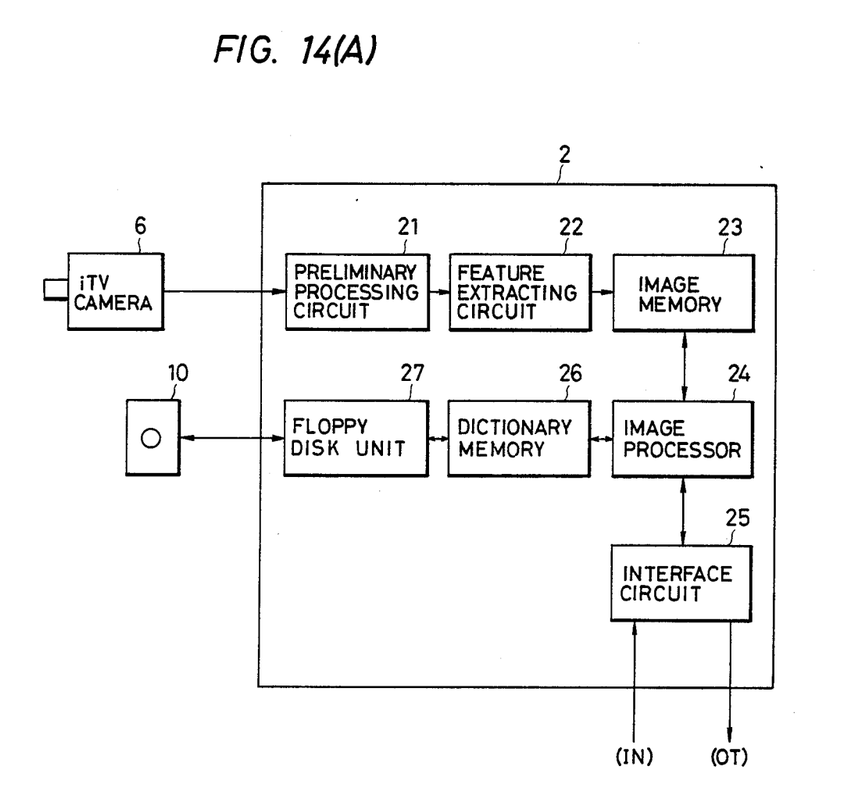
FIG. 14(A) is a schematic diagram of an alternate embodiment of the object identifying apparatus of the present invention.

FIG. 14(A) shows a modification of the object identifying apparatus according to the present invention. The features of the modification reside in the dictionary memory 26, and an auxiliary memory unit 27 such as a floppy disk. In FIG. 14(A), reference numeral 10 designates a floppy diskette.

In the modification, the dictionary (map data) of an object which is obtained in the learning mode is stored in the dictionary memory 26 that is large in capacity. In order to maintain the map data for a long period of time, a floppy disk unit 27 is provided as an auxiliary memory unit and the map data is stored on the floppy diskette 10. The image processor 24 reads only the dictionary of an object to be identified out of the dictionary memory 26, to perform the collation. In this case, the use of a dictionary is instructed through the interface circuit 25.

Figure 14B:
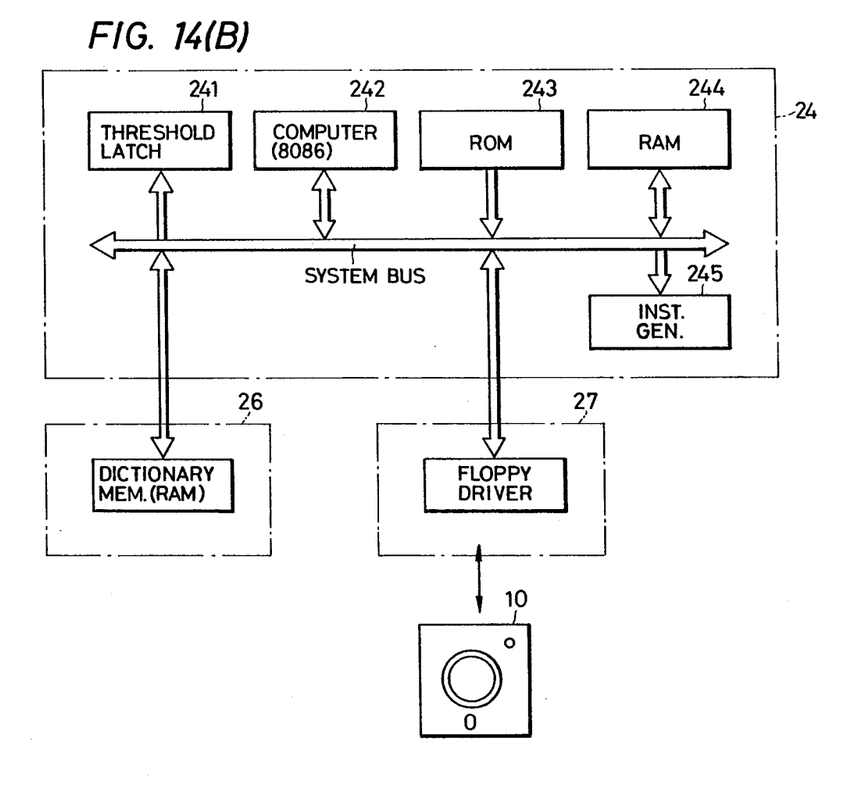
FIG. 14(B) is a detailed circuit block diagram of the embodiment of FIG. 14(A).

FIG. 14(B) is a detailed circuit block diagram showing the image processor 24, the dictionary memory 26, the floppy disk unit 27 and the floppy diskette 10. According to the increase or decrease in the number of objects to be distinguished, data to be loaded into the dictionary memory 26 is read out from the floppy diskette 10 by the floppy disk unit 27 such as a floppy disk driver. The data read out is transferred to the dictionary memory 26 such as a RAM to be stored therein. The image processor 24 has a circuit construction substantially the same as that of FIG. 1(B). The image processor 24 also operates to carry out the distinguishing and identifying operation in accordance with the content of the memory 26 which has been stored in advance.

As is apparent from the above description, according to the present invention, even in the case of a plurality of objects overlapping one another, the boundary is divided into the predetermined primitive elements, and the attributes and the correlations of the primitive elements stored as dictionary patterns and the distance maps of the main feature points thereof are subjected to collation. Thus, according to the present invention, general objects can be identified. Furthermore, the dictionary pattern can be formed in the learning mode, and, therefore, things to be identified can be readily registered in the dictionary. In addition, by expressing the contour of an object with the primitive elements, the number of combinations in collation of the dictionary and an unknown object is decreased, and, therefore, the collation time can be decreased.

What is claimed is:

1. An apparatus for identifying an object from a video signal representing an image of the object, the apparatus comprising:

feature data extracting means for converting the video signal into boundary gradient and contour data representing the boundary of the object;

means, coupled to said feature data extracting means, for processing said boundary gradient and contour data to identify abrupt changes in the gradient of the boundary of the object as a series of object points;

means for generating primitive element data associated with each of a plurality of segments singly disposed between adjacent ones of said object points on the boundary of the object and distance map data associated with said primitive element data to represent the positional relationships of each of said segments with respect to said object points in the boundary of the object, said primitive element data comprising characteristic data to identify said associated segment as (1) a straight line, (2) a circle or circular arc, or (3) an ellipse or an elliptical arc;

dictionary memory means for storing reference primitive element data and reference distance map data associated with a plurality of known, reference objects, said reference primitive element data including reference characteristic data identifying the contour of said associated reference object as one reference segment or a combination of reference segments wherein each reference segment comprises (1) a straight line, (2) a circle or circular arc, or (3) an ellipse or elliptical arc, said reference distance map data representing the positional relationships of each reference segment in the boundary of a reference object; and means, coupled to said processing means, said generating means, and said dictionary memory means for correlating said primitive element data and said distance map data associated with the object and said reference primitive element data and said reference distance map data associated with said reference objects and stored in said dictionary memory means to identify the object as the one of said reference objects with the greatest correlation with the object.

2. An apparatus according to claim 1, further including an image memory connected to said feature data extracting means and said processing means for storing said primitive element data and distance map data associated with said object.

3. A method for identifying an object from a video signal representing an image of the object, the method comprising the steps of:

converting the video signal into a combination of gradient data and contour data representing the boundary of the object;

identifying, from said gradient data and said contour data, a series of object points corresponding to abrupt changes in the gradient of the boundary of the object;

generating primitive element data associated with each of a plurality of segments singly disposed between adjacent object points on the boundary of the object, said primitive element data comprising characteristic data to identify said associated segment as (1) a straight line, (2) a circle or circular arc, or (3) an ellipse or elliptical arc;

generating distance map data associated with the primitive element data, said distance map data representing the positional relationships of each of the segments in the boundary of the object;

correlating said primitive element data and said distance map data associated with the object with reference primitive element data and reference distance map data associated with a plurality of known reference objects, said reference primitive element data including reference characteristic data identifying the contour of said associated reference object as one reference segment or a combination of reference segments, wherein said reference segments comprise (1) a straight line, (2) a circle or circular arc, or (3) an ellipse or elliptical arc, said reference distance map data representing the positional relationships of said reference segments in the boundary of said associated reference object; and identifying the object as the one of said plurality of reference objects with the greatest correlation with the object.

* * * * *